United States Patent
Fan et al.

(10) Patent No.: US 7,525,909 B2
(45) Date of Patent: Apr. 28, 2009

(54) METHOD AND APPARATUS FOR DYNAMIC ADJUSTMENT OF RISE-OVER-THERMAL (ROT) THRESHOLD FOR REVERSE LINK RATE ALLOCATION

(75) Inventors: Mingxi Fan, San Diego, CA (US); Eduardo A. S. Esteves, Sao Paulo (BR); Rashid Ahmed Attar, San Diego, CA (US); Naga Bhushan, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 982 days.

(21) Appl. No.: 10/600,231

(22) Filed: Jun. 19, 2003

(65) Prior Publication Data

US 2004/0258035 A1    Dec. 23, 2004

(51) Int. Cl.
H04J 3/14 (2006.01)
G01R 31/08 (2006.01)
H04B 7/216 (2006.01)

(52) U.S. Cl. ............... 370/230; 370/252; 370/329; 370/341

(58) Field of Classification Search .................. None
See application file for complete search history.

(56) References Cited

U.S. PATENT DOCUMENTS

| | | | |
|---|---|---|---|
| 6,317,600 B1 | 11/2001 | Salonaho et al. | |
| 6,628,924 B1 | 9/2003 | Miyamoto | |
| 6,745,034 B2* | 6/2004 | Wang et al. | 455/441 |
| 6,996,373 B2* | 2/2006 | Kurhila et al. | 455/67.11 |
| 7,050,814 B2* | 5/2006 | Al-Housami | 455/452.1 |
| 7,154,854 B1* | 12/2006 | Zweig et al. | 370/236 |
| 2002/0067701 A1* | 6/2002 | Chen et al. | 370/318 |
| 2002/0181410 A1* | 12/2002 | Bae et al. | 370/252 |
| 2003/0179708 A1* | 9/2003 | Kamerman et al. | 370/241 |
| 2004/0240424 A1* | 12/2004 | Fong et al. | 370/349 |

FOREIGN PATENT DOCUMENTS

JP      2000-307511      11/2000

OTHER PUBLICATIONS

Attar et al., "A Reverse Link Outer-Loop Power Control Algorithm for cdma2000 1xEV Systems," 2002 IEEE International Conference on Communications, Conference Proceedings, New York, NY, vol. 1 of 5, Apr. 28, 2002, pp. 573-578.
Fan et al., "The Impact of Antenna-array Receivers on the Reverse Link Performance of CDMA2000 1xEV High Rate Packet Data Systems," Vehicular Technology Conference, 2003, Piscataway, New Jersey, vol. 2, Oct. 6, 2003, pp. 841-846.

(Continued)

*Primary Examiner*—Chi H. Pham
*Assistant Examiner*—Soon D. Hyun
(74) *Attorney, Agent, or Firm*—Dang M. Vo (57) ABSTRACT

A method and an apparatus of dynamically setting a rise-over-thermal (ROT) threshold to control user-to-user interferences in a wireless communication system are disclosed. The ROT threshold is set by determining whether an outage of communication has occurred, increasing the ROT threshold by a predetermined increment if the outage has not occurred, and decreasing the ROT threshold by a predetermined decrement if the outage has occurred.

33 Claims, 7 Drawing Sheets

OTHER PUBLICATIONS

Chakravarty, Sumantra et al., "*An Algorithm for Reverse Traffic Channel Rate Control for cdma2000 High Rate Packet Data Systems*," Globecom2001, Nov. 2001.
CDMA 2000 1xEV-EO Standard, "3rd Generation Partnership Project 2 '3GPP2' CDMA2000 High Rate Packet Data Air Interfact Specification," 3GPP2 C.S0024 Version 3.0, Dec. 5, 2001.
International Search Report - PCT/US04/019002 - International Search Authority, European Patent Office - Jan. 7, 2005.
International Preliminary Report on Patentability - PCT/US04/019002 - IPEA, US - Jul. 6, 2006.
Written Opinion - PCT/US04/019002 - International Search Authority, European Patent Office - Jan. 7, 2005.

* cited by examiner

METHOD AND APPARATUS FOR DYNAMIC ADJUSTMENT OF RISE-OVER-THERMAL (ROT) THRESHOLD FOR REVERSE LINK RATE ALLOCATION

BACKGROUND

1. Field of the Invention

The present invention relates generally to telecommunications, and more specifically, to wireless communications.

2. Background

In a reverse link scheme of a system based on the CDMA 2000 1xEV-DO standard according to "3rd Generation Partnership Project 2 '3GPP2' CDMA2000 High Rate Packet Data Air Interface Specification," 3GPP2 C.S0024 Version 3.0, Dec. 5, 2001, a plurality of access terminals (ATs) are allowed to access a base transceiver station (BTS) in an access network (AN) simultaneously. The reverse link data rate of each access terminal in the state of the art ranges from 9.6 kilobits per second (kbps) to 153.6 kbps and is controlled by using a closed-loop rate adaptation (CLRA) algorithm which is known to a person skilled in the art.

The data rates for the access terminals communicating with the base transceiver station vary depending on the status of a reverse activity (RA) bit which is set by the base transceiver station and transmitted to the access terminals. According to the CDMA 2000 1xEV-DO standard, if the RA bit is set to 1, all access terminals communicating with the base transceiver station are instructed to lower their data rates to maintain system stability. If the RA bit is set to 0, then the access terminals may increase their data rates as long as sufficient transmit power is available to support the increased data rates.

The base transceiver station typically sets the RA bit based on the maximum ratio $I_0/N_0$ per antenna, where $I_0$ is the total power received by an antenna and $N_0$ is the thermal noise power. In general, the $I_0/N_0$ ratio, which is also called the rise-over-thermal (ROT) ratio, serves as an indication of the level of user-to-user interference in a wireless communication system. A higher ROT ratio is usually indicative of a higher level of user-to-user interference.

If the ROT is higher, access terminals with good link conditions typically operate at higher data rates, and consequently all access terminals operate at higher transmit power. Excessive power transmitted by all access terminals may cause excessive multiple-access interference (MAI) at the base transceiver station, thereby destabilizing the power control loop and consequently resulting in outage situations for access terminals near the sector edge of the base station antenna.

A typical scheme of limiting the transmitted power of the access terminals to prevent excessive MAI is to limit the ROT such that the ROT is below a certain threshold. In a conventional CDMA 2000 1xEV reverse link, the limit on the ROT is accomplished by setting the RA bit and transmitting the RA bit to the access terminals. For example, if the ROT exceeds a certain threshold, the base transceiver station sets the RA bit to 1 to signal the access terminals to lower their data rates. Otherwise, the RA bit is set to 0. The RA bit is typically set at predetermined intervals, for example, once every sixteen slots.

In the current CDMA 2000 1xEV system, the ROT threshold is a fixed number that is predetermined before the base transceiver station is operational. The ROT threshold is typically calibrated for a certain operating environment for the base transceiver station and set to a fixed value which theoretically would maximize the system throughput while minimizing the probability of outages for access terminals near the sector edge. In general, an ROT threshold that is set at an excessively high value may lead to system instability and cause excessive outages and poor performance for users near the cell edge, whereas an ROT threshold that is set too conservatively forces access terminals to reduce their data rates unnecessarily, thereby suppressing the overall system throughput.

In many practical situations, the radio channels of a typical base transceiver station are dynamic. The interference conditions for a typical base transceiver station depend not only on a fixed sector layout but are also affected by various factors such as time-varying shadowing, multipath fading, and the positions and movements of access terminals communicating with the base transceiver station. Therefore, it is nearly impossible to set the ROT threshold at a fixed optimal value which ideally would maximize the system throughput while minimizing the multiple-access interference at all times. In many practical situations, the ROT threshold is typically set conservatively to limit outages in the worse-case scenario, thereby leading to lower than desired system throughput when no significant multiple-access interference is present.

Therefore, there is a need in the art for a scheme for dynamically setting the ROT threshold during the operation of the base transceiver station in response to time-varying interference conditions.

SUMMARY

Embodiments disclosed herein address the above stated needs by dynamically setting a rise-over-thermal (ROT) threshold in a wireless communication system, including determining whether an outage of communication has occurred, increasing the ROT threshold by a predetermined increment if the outage has not occurred, and decreasing the ROT threshold by a predetermined decrement if the outage has occurred.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

A subscriber station, referred to herein as an access terminal (AT), may be mobile or stationary, and may communicate with one or more base transceiver stations, referred to herein as modem pool transceivers (MPTs). An access terminal transmits and receives data packets through one or more modem pool transceivers to a base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example, using fiber optic or coaxial cables. An access terminal may further be any of a number of types of devices including but not limited to PC card, compact flash, external or internal modem, or wireless or wireline telephone. The communication link through which the access terminal sends signals to the modem pool transceiver is called a reverse link. The communication link through which a modem pool transceiver sends signals to an access terminal is called a forward link.

Figure 1:
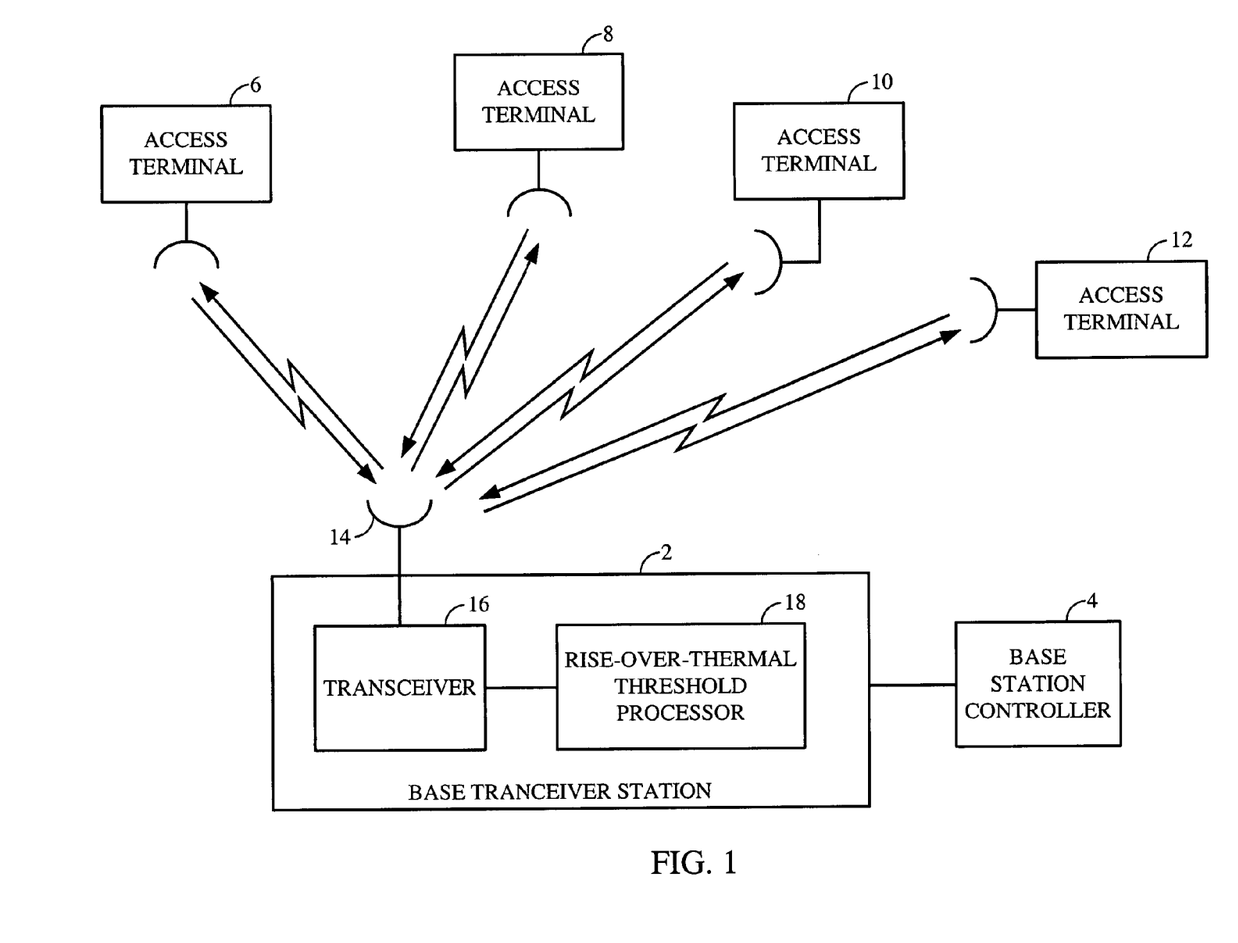
FIG. 1 is a simplified block diagram of a wireless communication system in which embodiments of the present invention may be implemented.

FIG. 1 is a simplified block diagram of a wireless communication system which includes a base transceiver station (BTS) 2, a base station controller 4 connected to the base transceiver station 2, and a plurality of access terminals 6, 8, 10 and 12 communicating with the base transceiver station 2. It is assumed that the access terminals 6, 8, 10 and 12 depicted in FIG. 1 are within a given sector of the base transceiver station 2. The base transceiver station 2 includes one or more antennas 14, a transceiver 16 connected to the antenna 14, and a rise-over-thermal (ROT) threshold processor 18 connected to the transceiver 16. The base transceiver station may also include various other components known to a person skilled in the art.

The access terminals 6, 8, 10 and 12 may communicate with the base transceiver station 2 simultaneously, but each of the access terminals may communicate at a different data rate due to various factors such as time-varying shadowing, multipath fading, the position of the access terminal, and the movement of the access terminal if the access terminal is a mobile station. For example, if an access terminal is near the edge of the sector, it may be required to transmit data to the base transceiver station 2 at a lower data rate to compensate for fading. The data rates of reverse link transmission by the access terminals are in the range of 9.6 kilobits per second to 153.6 kilobits per second under the CDMA 2000 1xEV-DO standard, for example.

The reverse link data rate of each access terminal may be adjusted by the base transceiver station 2 which transmits a reverse activity (RA) bit to signal the access terminal to decrease the data rate if the ROT at the base transceiver station 2 exceeds an ROT threshold. In an embodiment according to the present invention, the ROT threshold is dynamically increased or decreased in response to a determination by the ROT threshold processor 18 at the base transceiver station 2 whether an outage has occurred at at least one of the access terminals 6, 8, 10 and 12.

Figure 2:
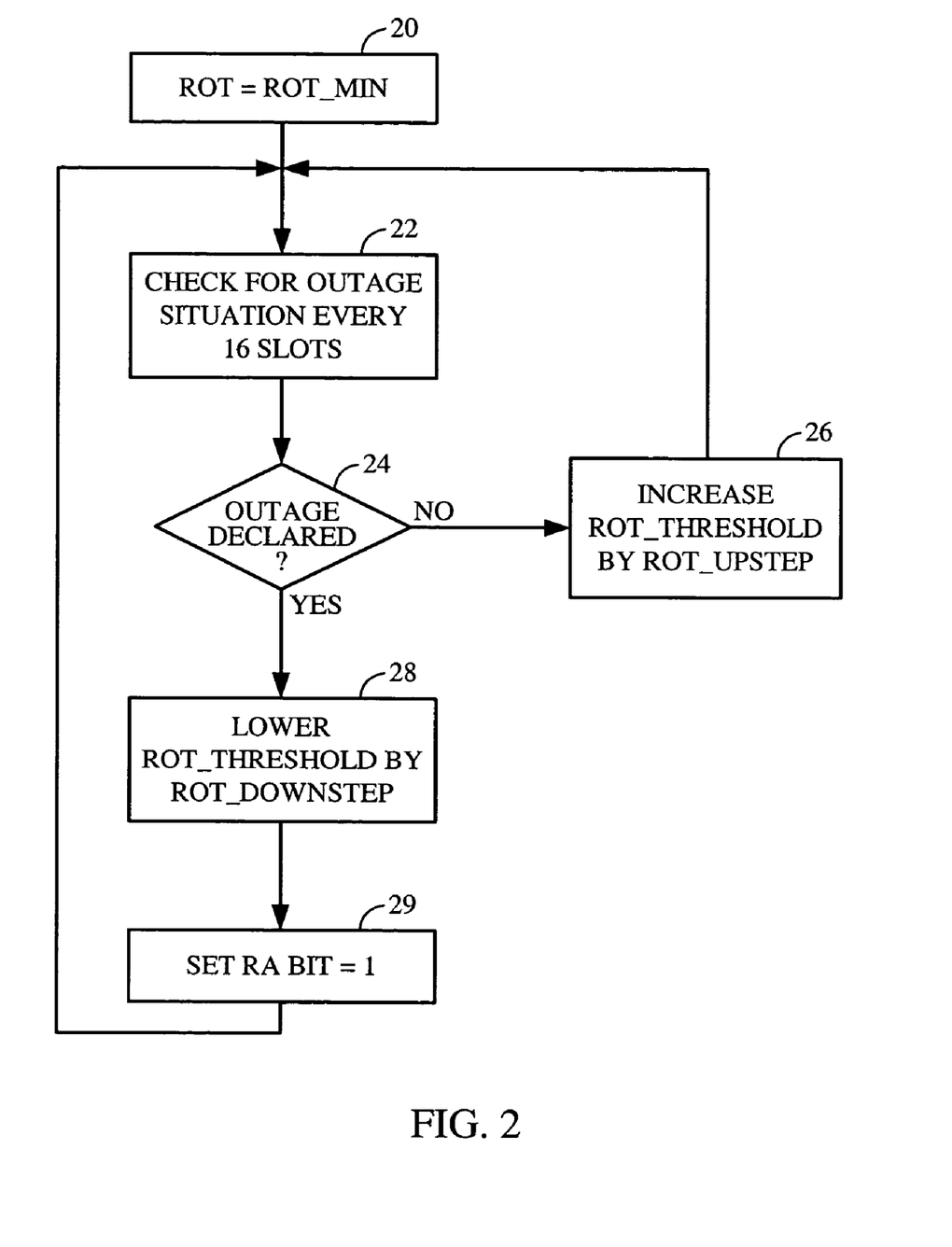
FIG. 2 is a flow chart illustrating an embodiment of process steps implemented according to the present invention.

FIG. 2 is a flow chart illustrating an embodiment of process steps implemented for setting the ROT threshold according to the present invention. The ROT threshold is initially set at a predetermined minimum ROT threshold (ROT_MIN) as indicated by block 20, for example, a minimum ROT threshold of 5 dB. The ROT threshold processor at the base transceiver station checks for an outage situation at one of the access terminals, for example, the access terminal transmitting at the lowest data rate, every time a set of data is received. In an embodiment, the processor may check for an outage situation once every packet or sixteen slots as indicated by block 22. The processor then determines whether to declare an outage for the access terminal as indicated by block 24. If no outage is declared, the processor increases the ROT threshold by a predetermined increment (ROT_UPSTEP) as indicated by block 26, and the processor then checks for an outage situation as the next packet is received by the base transceiver station.

If an outage is declared, then the processor decreases the ROT threshold by a predetermined decrement (ROT_DOWNSTEP) as indicated by block 28, and the base transceiver station sets the RA bit to 1 to signal all of the access terminals communicating with the base transceiver station within the sector to lower their data rates as indicated by block 29. After the ROT threshold is decreased, the processor determines whether the outage situation continues as the next packet is received by the base transceiver station. In an embodiment, the ROT increment (ROT_UPSTEP) is much smaller than the ROT decrement (ROT_DOWNSTEP) to maintain a low probability of outage. For example, the ROT_UPSTEP may be 0.01 dB whereas the ROT_DOWNSTEP may be 1 dB. Even if an outage situation does not occur at any of the access terminals communicating with the base transceiver station, it may be desirable to cap the ROT threshold at a predetermined maximum threshold, for example, a maximum ROT threshold (ROT_MAX) of 9 dB.

Figure 3:
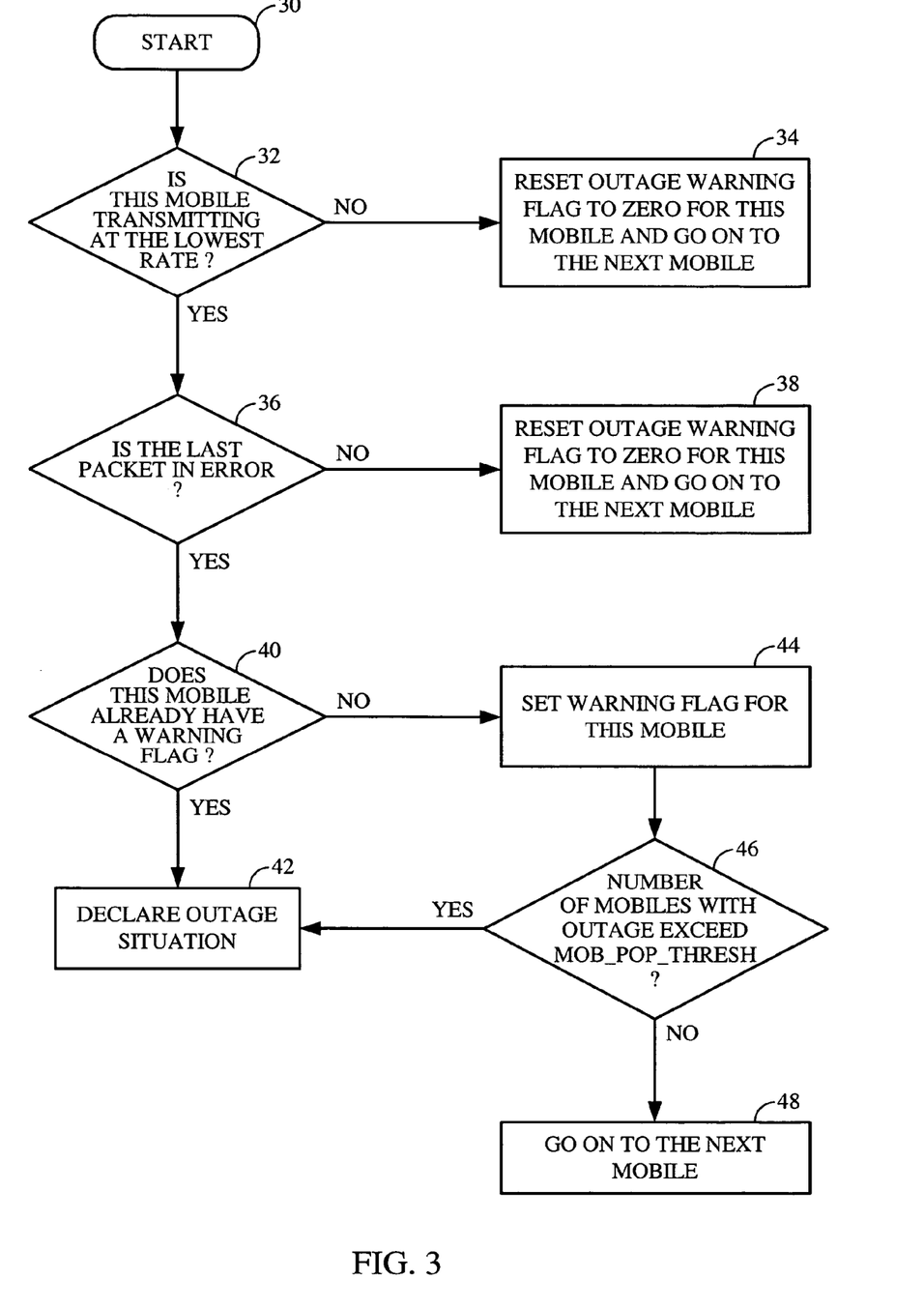
FIG. 3 is a flow chart illustrating an embodiment of additional process steps implemented according to the present invention.

FIG. 3 is a flow chart illustrating an embodiment of detecting an outage as part of dynamically setting the ROT threshold according to the present invention. In this embodiment, the base transceiver station tracks the access terminals transmitting at the lowest data rate because outages are most likely to occur at these access terminals, as their data rates are constrained mainly by propagation loss as well as other factors. Furthermore, at least a portion of memory in the ROT threshold processor is used for storing outage warning flags for each of the access terminals communicating with the base transceiver station.

As illustrated in FIG. 3, the base transceiver station starts tracking a particular access terminal as indicated by block 30, and determines whether the access terminal is transmitting at the lowest data rate as indicated by block 32. If the access terminal is not transmitting at the lowest data rate, then the base transceiver station resets the outage warning flag for the access terminal to zero and determines whether another access terminal communicating with the base transceiver station is transmitting at the lowest data rate as indicated by block 34. If more than one access terminal transmits at the lowest data rate, then all of the access terminals transmitting data to the base transceiver station at the lowest data rate are tracked for errors.

For a particular access terminal transmitting at the lowest data rate, the base transceiver station determines whether the last packet received from the access terminal has an error as indicated by block 36. In an embodiment, if the last packet received from the access terminal has no error, the base transceiver station eliminates the outage warning flag or resets the warning flag for the access terminal to zero as indicated by block 38, even if there was a warning flag indicating an error in a previous packet received from the access terminal. Alternatively, the base transceiver station may continue to count the number of warning flags and declare an outage for the access terminal if the number of warning flags for the access terminal exceeds a predetermined threshold number.

Referring to the embodiment illustrated in FIG. 3, if the last packet received from the particular access terminal being tracked has an error as indicated by block 36, then the base transceiver station determines whether a warning flag already exists for the access terminal due to an error in a previously received packet as indicated by block 40. If a warning flag already exists for the access terminal, then an outage is declared for the access terminal as indicated by block 42. In this embodiment, an outage is declared for the access terminal transmitting at the lowest data rate if errors exist in two consecutive packets received from the access terminal. Alternatively, the base transceiver station may track the number of errors in a certain number of consecutive packets and declare an outage for the access terminal if the number of errors in the packets exceeds a predetermined threshold number.

Referring to the embodiment illustrated in FIG. 3, if the access terminal does not already have a warning flag due to an error in the previously received packet as indicated by block 40, the base transceiver station sets a warning flag for the access terminal as indicated by block 44, but does not yet declare an outage for the access terminal. However, an outage will be declared for the access terminal which already has a warning flag if the next packet received from the access terminal also has an error.

After the warning flag is set for the particular access terminal which has been transmitting at the lowest data rate and has experienced an error in the last packet as indicated by block 44, the base transceiver station counts the total number of access terminals with warning flags within the sector, and determines whether the number of access terminals with warning flags exceeds a predetermined threshold number (MOB_POP_THRESH) as indicated by block 46. An outage situation is declared for the entire sector to signal that the ROT threshold should be lowered. If the number of access terminals with warning flags exceeds the predetermined threshold number, the base transceiver station declares an outage situation in the sector as indicated by block 42 but does not indicate an outage for any individual access terminal. If the number of access terminals with warning flags does not exceed the predetermined threshold number, the base transceiver station then checks whether any other access terminals communicating with the base transceiver station are now transmitting at the lowest data rate as indicated by block 48.

In an embodiment, the base transceiver station tracks the packets received from access terminals transmitting at the lowest data rate for frame errors. If an access terminal transmitting at the lowest data rate experiences two frame errors over two consecutive packets, then an outage is declared for the access terminal. If multiple access terminals communicating with the base transceiver station in a given sector have warning flags due to frame errors, the base transceiver station also declares an outage situation for the sector. For example, if more than two access terminals communicating with the base transceiver station in a given sector have warning flags, the base transceiver station may declare that the sector has an outage and signal other access terminals communicating with the base transceiver station to lower their data rates by setting the RA bit to 1. In an embodiment, the frame error information can be obtained by the base transceiver station 2 at no extra cost in terms of bandwidth or data bits because the frame error information is supplied by the base station controller 4 as illustrated in FIG. 1 for outer-loop power control.

The performance of an exemplary adaptive ROT threshold algorithm for performing the process steps illustrated in FIGS. 2 and 3 and described above have been evaluated by a simulation in an access network with two antennas at the base transceiver station, seven sectors and 16 access terminals per sector. The parameters in the algorithm are set according to the table below:

| Parameter | Value |
| --- | --- |
| ROT_MIN | 5 dB |
| ROT_MAX | 9 dB |
| ROT_UPSTEP | 0.01 dB |
| ROT_DOWNSTEP | 1 dB |
| MOB_POP_THRESH | 2 |

Figure 4:
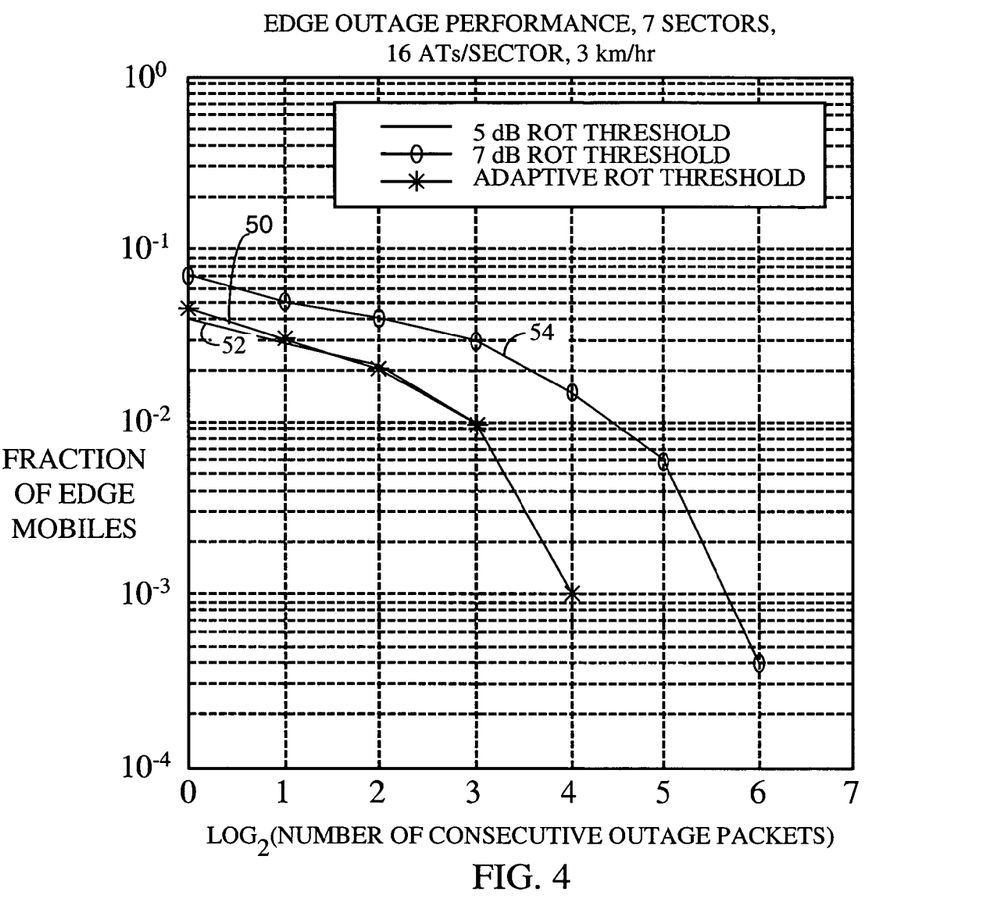
FIG. 4 is an exemplary plot illustrating simulated edge outage performance of an access network in which a base transceiver station communicates with a number of slow-moving access terminals.

Exemplary outage and throughput characteristics of simulated mobile access terminals using the algorithm with the above parameters are illustrated in FIGS. 4-7. FIG. 4 is an exemplary plot of the fraction of edge access terminals going into outage situations versus the number of consecutive outage packets in this situation, assuming that the base transceiver station has seven sectors, that there are 16 access terminals within each sector, and that the access terminals are moving at 3 km/hour, which is approximately the typical speed of a pedestrian. In this plot, the fraction of edge access terminals going into outage situations versus the number of consecutive outage packets are illustrated logarithmically as edge outage performance curves. The edge outage performance curve 50 of the ROT threshold obtained by the adaptive ROT threshold algorithm with the above parameters is compared to the performance curve 52 of a 5 dB fixed ROT threshold and the performance curve 54 of a 7 dB fixed ROT threshold. FIG. 4 shows that the edge outage performance of the adaptive ROT threshold algorithm is much better than that of the 7 dB fixed ROT threshold and is very close to that of the 5 dB fixed ROT threshold.

Figure 5:
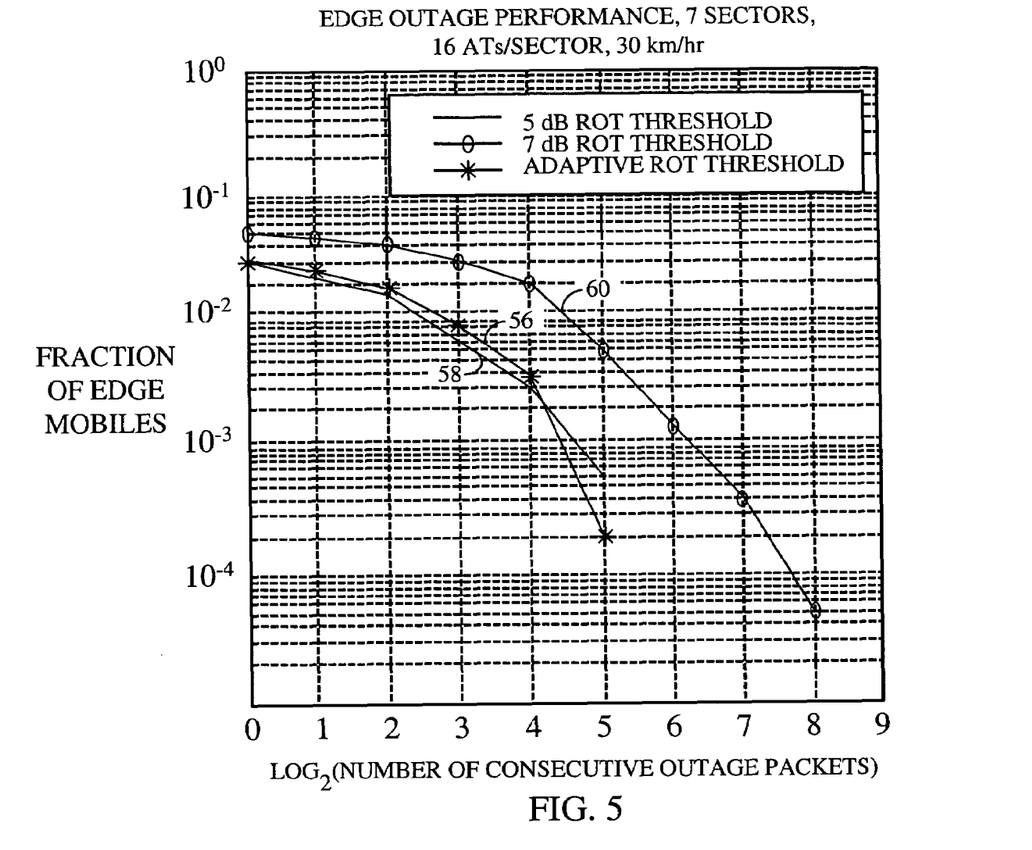
FIG. 5 is an exemplary plot illustrating simulated edge outage performance of an access network in which a base transceiver station communicates with a number of fast-moving access terminals.

FIG. 5 is an exemplary plot of the fraction of edge access terminals going into outage situations versus the number of consecutive outage packets, assuming that the base transceiver station has seven sectors, that there are 16 access terminals within each sector, and that the access terminals are moving at 30 km/hour, as if the access terminals are in a surface vehicle traffic. The edge outage performance curve 56 of the ROT threshold obtained by the adaptive ROT threshold algorithm with the above parameters is compared to the performance curve 58 of a 5 dB fixed ROT threshold and the performance curve 60 of a 7 dB fixed ROT threshold. FIG. 5 shows that the edge outage performance of the adaptive ROT threshold algorithm is much better than that of the 7 dB fixed ROT threshold.

Although the edge outage performance of the adaptive ROT threshold algorithm is slightly worse than that of the 5 dB fixed ROT threshold when the number of consecutive outage packets is in the range of 1 to 16, corresponding to $\log_2$(number of consecutive outage packets) in the range of 0 to 4 in FIG. 5, the adaptive ROT threshold algorithm produces better edge outage performance than that of the 5 dB fixed ROT threshold when the number of consecutive outage packets is 32 or greater, corresponding to $\log_2$(number of consecutive outage packets) being 5 or greater in FIG. 5. It is apparent from FIGS. 4 and 5 that the adaptive ROT threshold algorithm according to an embodiment of the present invention results in a significantly smaller fraction of edge access terminals in outage situations compared to the fraction of edge access terminals in outage situations using the 7 dB fixed ROT threshold.

Figure 6:
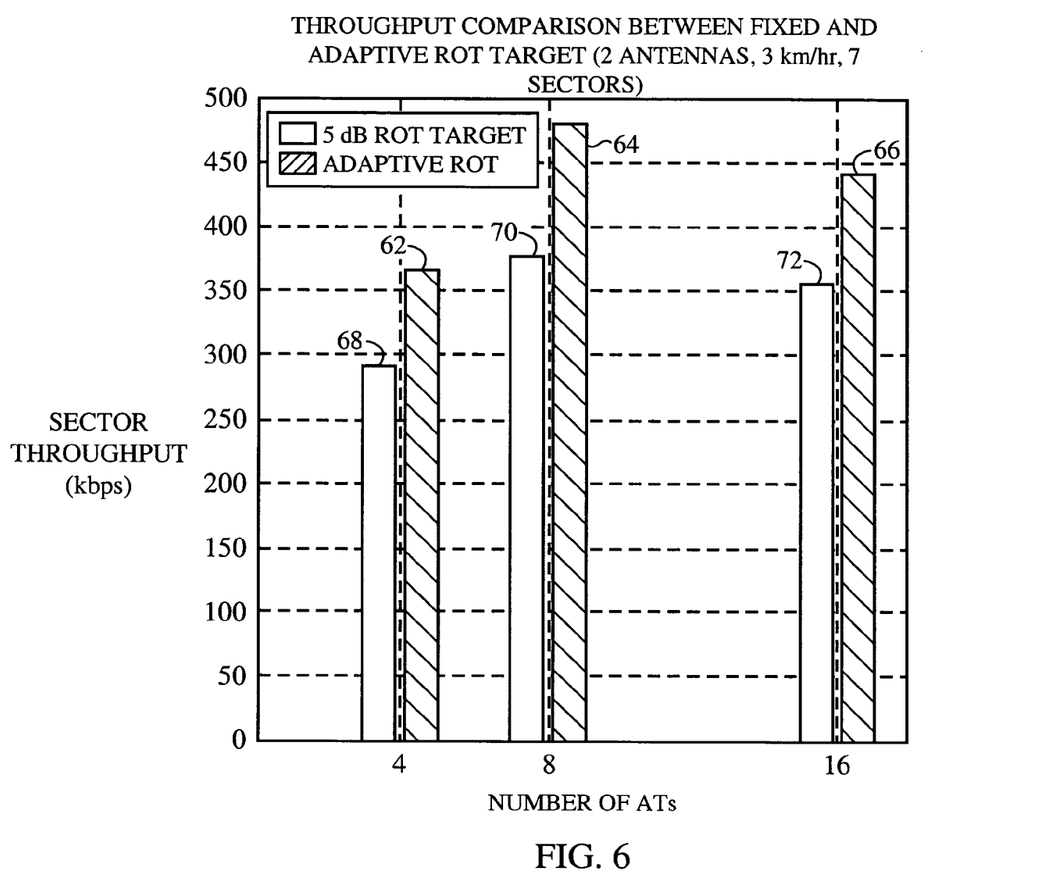
FIG. 6 is an exemplary bar graph illustrating simulated throughput performance of an access network in which a base transceiver station communicates with a number of slow-moving access terminals.
Figure 7:
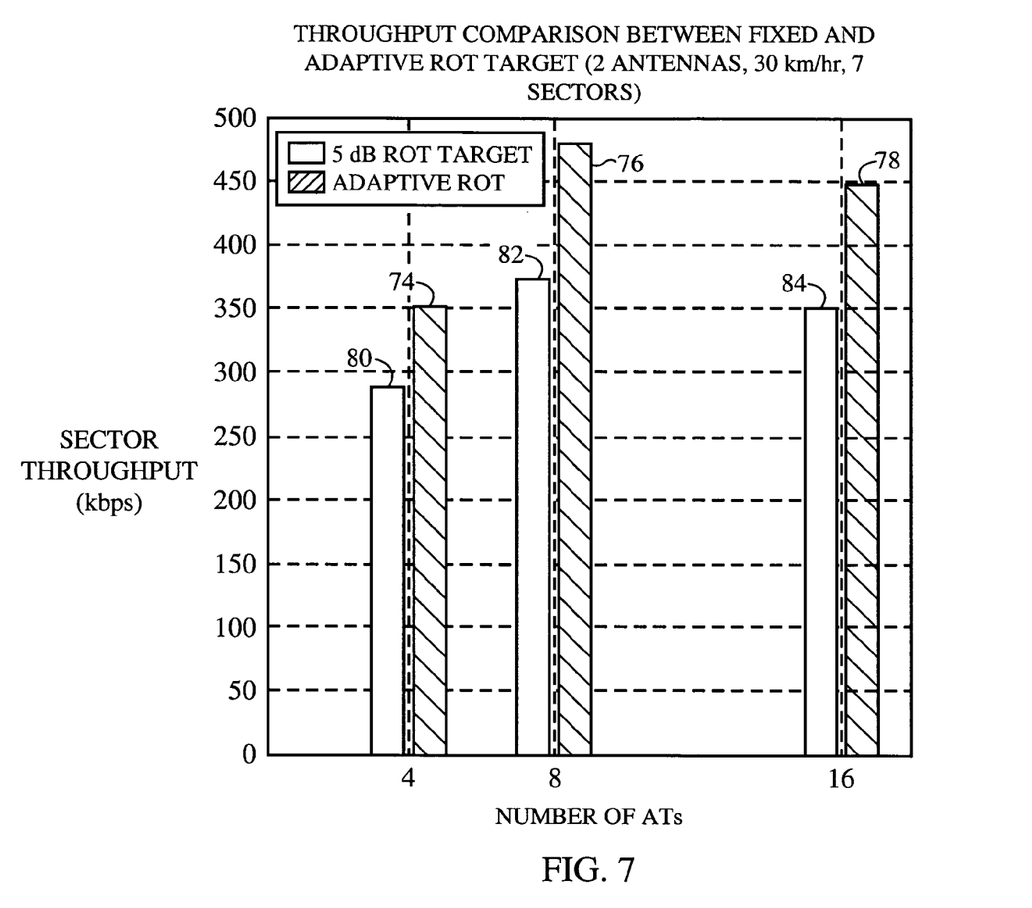
FIG. 7 is an exemplary bar graph illustrating simulated throughput performance of an access network in which a base transceiver station communicates with a number of fast-moving access terminals.

FIGS. 6 and 7 are exemplary bar graphs illustrating the comparisons between throughputs resulting from a 5 dB fixed ROT threshold and throughputs resulting from the adaptive ROT threshold algorithm for access terminals moving at 3 km/hour and at 30 km/hour, respectively. As shown in FIG. 6, the sector throughputs (in kilobits per second) resulting from the adaptive ROT threshold algorithm represented by bars 62, 64 and 66, assuming that there are 4, 8 and 16 access terminals moving at 3 km/hour within a given sector of the base transceiver station, respectively, are much higher than the corresponding sector throughputs resulting from the 5 dB fixed ROT threshold represented by bars 68, 70 and 72, respectively. As shown in FIG. 7, the sector throughputs resulting from the adaptive ROT threshold algorithm represented by bars 74, 76 and 78, assuming that there are 4, 8 and 16 access terminals moving at 30 km/hour within a given sector of the base transceiver station, respectively, are much higher than the corresponding sector throughputs resulting from the 5 dB fixed ROT threshold represented by bars 80, 82 and 84, respectively.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect," "connected to" and "connection" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, a hard disk, a removable disk, a compact disc-read only memory (CD-ROM), or any other form of storage medium known in the art. An exemplary storage medium is coupled to the processor such that the processor can read information from, and write information to, the storage medium. Alternatively, the storage medium may be integral to the processor. The processor and the storage medium may reside in a single ASIC or as separate components in a base transceiver station, for example.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of dynamically setting a rise-over-thermal (ROT) threshold in a communication system, the method comprising:
   determining whether an outage of communication has occurred, wherein the step of determining whether the outage of communication has occurred comprises:
      determining which one of a plurality of access terminals is transmitting data to a base transceiver station at a lowest data rate;
      determining whether a set of data received from the access terminal transmitting at the lowest data rate has an error; and
      setting a warning flag for the access terminal transmitting at the lowest data rate has an error;
   increasing the ROT threshold by a predetermined increment if the outage has not occurred; and
   decreasing the ROT threshold by a predetermined decrement if the outage has occurred.

2. The method of claim 1, further comprising setting a reverse activity bit (RAB) to 1 if the outage has occurred.

3. The method of claim 1, further comprising initially setting the ROT threshold to a predetermined minimum ROT threshold.

4. The method of claim 1, wherein the step of determining whether the outage of communication has occurred further comprises:

determining whether a second set of data received from the access terminal transmitting at the lowest data rate has an error; and declaring the outage for the access terminal transmitting at the lowest data rate has an error.

5. The method of claim 4, wherein the step of determining whether the outage of communication has occurred further comprises eliminating the warning flag for the access terminal transmitting at the lowest data rate if the second set of data received from the access terminal transmitting at the lowest data rate does not have an error.

6. The method of claim 1, wherein the step of determining whether the set of data received from the access terminal transmitting at the lowest data rate has an error comprises determining whether a packet received from the access terminal transmitting at the lowest data rate has a frame error.

7. The method of claim 6, wherein the step of determining whether the outage of communication has occurred further comprises declaring the outage for the access terminal transmitting at the lowest data rate if two consecutive packets received from the access terminal transmitting at the lowest data rate have frame errors.

8. The method of claim 1, further comprising determining whether an outage has occurred at another one of the access terminals.

9. The method of claim 1, further comprising:
determining the number of access terminals with warning flags in a given sector communicating with the base transceiver station; and
declaring an outage for the sector if the number of access terminals with the warning flags exceeds a predetermined number.

10. An apparatus, comprising:
means for determining whether an outage of communication has occurred at one of the access terminals, wherein the means for determining whether the outage of communication has occurred comprises:
means for determining which one of the access terminals is transmitting data at a lowest data rate;
means for determining whether a set of data received from the access terminal transmitting at the lowest data rate has an error; and
means for setting a warning flag for the access terminal transmitting at the lowest data rate if the set of data received from the access terminal transmitting at the lowest data rate has an error;
means for increasing a rise-over-thermal (ROT) threshold by a predetermined increment if the outage has not occurred; and
means for decreasing the ROT threshold by a predetermined decrement if the outage has occurred.

11. The apparatus of claim 10, further comprising means for setting a reverse activity bit (RAB) to 1 if the outage has occurred.

12. The apparatus of claim 10, wherein the means for dynamically setting the ROT threshold further comprises means for initially setting the ROT threshold to a predetermined minimum ROT threshold.

13. The apparatus of claim 10, wherein the means for determining whether the outage of communication has occurred further comprises:
means for determining whether a second set of data received from the access terminal transmitting at the lowest data rate has an error; and
means for declaring the outage for the access terminal transmitting at the lowest data rate if the second set of data received from the access terminal transmitting at the lowest data rate has an error.

14. The apparatus of claim 13, wherein the means for determining whether the outage of communication has occurred further comprises means for eliminating the warning flag for the access terminal transmitting at the lowest data rate if the second set of data received from the access terminal transmitting at the lowest data rate does not have an error.

15. The apparatus of claim 10, wherein the means for determining whether the set of data received from the access terminal transmitting at the lowest data rate has an error comprises means for determining whether a packet received from the access terminal transmitting at the lowest data rate has a frame error.

16. The apparatus of claim 15, wherein the means for determining whether the outage of communication has occurred further comprises means for declaring the outage for the access terminal transmitting at the lowest data rate if two consecutive packets received from the access terminal transmitting at the lowest data rate have frame errors.

17. The apparatus of claim 10, wherein the means for dynamically setting the ROT threshold further comprises:
means for determining whether an outage has occurred at another one of the access terminals.

18. The apparatus of claim 10, wherein the means for dynamically setting the ROT threshold further comprises:
means for determining the number of access terminals with warning flags in a given sector; and
means for declaring an outage for the sector if the number of access terminals with the warning flags exceeds a predetermined number.

19. A computer program product comprising:
a computer readable medium encoded with computer executable instructions for dynamically setting a rise-over-thermal (ROT) threshold in a communication system, wherein the instructions comprising:
instructions for determining whether an outage of communication has occurred by:
determining which one of a plurality of access terminals is transmitting data to a base transceiver station at a lowest data rate;
determining whether a set of data received from the access terminal transmitting at the lowest data rate has an error; and
setting a warning flag for the access terminal transmitting at the lowest data rate has an error;
instructions for increasing the ROT threshold by a predetermined increment if the outage has not occurred;
instructions for decreasing the ROT threshold by a predetermined decrement if the outage has occurred.

20. A base transceiver station having at least one input and at least one output comprising:
a transceiver having at least one input and at least one output;
a rise-over-thermal threshold processor having at least one input and at least one output, wherein said at least one input is connected to said at least one output of said transceiver and said at least one output is connected to said at least one output of said base transceiver station; and
at least one antenna having at least one input and at least one output, wherein said at least one output is connected to said at least one input of said transceiver and said one input is connected to said at least one input of said base transceiver station, wherein said rise-over- thermal threshold processor:

determines whether an outage of communication has occurred at one of said access terminals, by:
  determining which one of said access terminals is transmitting data at a lowest data rate;
  determining whether a set of data received from said access terminal transmitting at said lowest data rate has an error; and
  setting a warning flag for the access terminal transmitting at the lowest data rate if the set of data received from said access terminal transmitting at the lowest data rate has an error;
increases said rise-over-thermal threshold by a predetermined increment if said outage has not occurred; and
decreases said rise-over-thermal threshold by a predetermined amount if said outage has occurred.

21. The base transceiver station, according to claim 20, wherein said transceiver receives data in a plurality of packets from a plurality of access terminals and said rise-over-thermal threshold processor dynamically sets a rise-over-thermal threshold for said access terminals.

22. The base transceiver station according to claim 20, wherein said rise-over-thermal threshold processor sets a reverse activity bit to 1 if said outage has occurred.

23. The base transceiver station according to claim 20, wherein said rise-over-thermal threshold processor initially sets the rise-over-thermal threshold to a predetermined minimum rise-over-thermal threshold.

24. The base transceiver station of claim 20, wherein said rise-over-thermal threshold processor:
  determines whether a second set of data received from said access terminal transmitting at said lowest data rate has an error; and
  declares said outage for said access terminal transmitting at said lowest data rate if said second set of data received from said access terminal transmitting at said lowest data rate has an error.

25. The base transceiver station of claim 24, wherein said rise-over-thermal threshold processor eliminates said warning flag for said access terminal transmitting at said lowest data rate if said second set of data received from said access terminal transmitting at said lowest data rate does not have an error.

26. The base transceiver station of claim 20, wherein said rise-over-thermal threshold processor determines whether a packet received from said access terminal transmitting at said lowest data rate has a frame error.

27. The base transceiver station of claim 26, wherein said rise-over-thermal threshold processor declares said outage for said access terminal transmitting at said lowest data rate if two consecutive packets received from said access terminal transmitting at said lowest data rate have frame errors.

28. The base transceiver station of claim 21, wherein said rise-over-thermal threshold processor determines whether an outage has occurred at another one of said access terminals.

29. The base transceiver station of claim 21, wherein said rise-over-thermal threshold processor:
  determines said number of access terminals with warning flags in a given sector; and
  declares an outage for said sector if said number of access terminals with said warning flags exceeds a predetermined number.

30. A method of dynamically setting a rise-over-thermal (ROT) threshold in a communication system, the method comprising:
  determining whether an outage of communication has occurred;
  determining whether the ROT threshold is equal to a predetermined maximum threshold;
  maintaining the ROT threshold at the predetermined maximum threshold if the ROT threshold is equal to the predetermined maximum threshold and the outage has not occurred;
  increasing the ROT threshold by a predetermined increment if the outage has not occurred; and
  decreasing the ROT threshold by a predetermined decrement if the outage has occurred.

31. An apparatus comprising:
  means for determining whether an outage of communication has occurred;
  means for determining whether the ROT threshold is equal to a predetermined maximum threshold;
  means for maintaining the ROT threshold at the predetermined maximum threshold if the ROT threshold is equal to the predetermined maximum threshold and the outage has not occurred;
  means for increasing the ROT threshold by a predetermined increment if the outage has not occurred; and
  means for decreasing the ROT threshold by a predetermined decrement if the outage has occurred.

32. A base transceiver station having at least one input and at least one output comprising:
  a transceiver having at least one input and at least one output;
  a rise-over-thermal threshold processor having at least one input and at least one output, wherein said at least one input is connected to said at least one output of said transceiver and said at least one output is connected to said at least one output of said base transceiver station; and
  at least one antenna having at least one input and at least one output, wherein said at least one output is connected to said at least one input of said transceiver and said one input is connected to said at least one input of said base transceiver station, wherein said rise-over-thermal threshold processor:
  determines whether an outage of communication has occurred;
  determines whether the ROT threshold is equal to a predetermined maximum threshold;
  maintains the ROT threshold at the predetermined maximum threshold if the ROT threshold is equal to the predetermined maximum threshold and the outage has not occurred;
  increases the ROT threshold by a predetermined increment if the outage has not occurred; and
  decreases the ROT threshold by a predetermined decrement if the outage has occurred.

33. A computer program product comprising:
  a computer readable medium encoded with computer executable instructions for dynamically setting a rise-over-thermal (ROT) threshold in a communication system, comprising instructions for:
  determining whether an outage of communication has occurred;
  determining whether the ROT threshold is equal to a predetermined maximum threshold;
  maintaining the ROT threshold at the predetermined maximum threshold if the ROT threshold is equal to the predetermined maximum threshold and the outage has not occurred;
  increasing the ROT threshold by a predetermined increment if the outage has not occurred; and
  decreasing the ROT threshold by a predetermined decrement if the outage has occurred.

* * * * *